(12) United States Patent
Barton, III et al.

(10) Patent No.: US 8,743,657 B1
(45) Date of Patent: Jun. 3, 2014

(54) RESOLUTION ANALYSIS USING VECTOR COMPONENTS OF A SCATTERED ACOUSTIC INTENSITY FIELD

(75) Inventors: Robert J. Barton, III, North Kingstown, RI (US); Kevin B. Smith, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 601 days.

(21) Appl. No.: 13/066,734

(22) Filed: Apr. 22, 2011

(51) Int. Cl.
*G01S 15/00* (2006.01)
*G01S 15/89* (2006.01)

(52) U.S. Cl.
CPC ............ *G01S 15/89* (2013.01); *G01S 15/8902* (2013.01)
USPC .......................................................... 367/88

(58) Field of Classification Search
USPC .................................................... 367/87, 88
See application file for complete search history.

(56) References Cited

U.S. PATENT DOCUMENTS

| | | | | |
|---|---|---|---|---|
| 3,500,951 A | * | 3/1970 | Beeken .......................... | 181/123 |
| 5,438,552 A | * | 8/1995 | Audi et al. ...................... | 367/88 |
| 6,002,644 A | * | 12/1999 | Wilk ................................ | 367/88 |
| 6,363,345 B1 | * | 3/2002 | Marash et al. ................. | 704/226 |
| 7,315,485 B1 | * | 1/2008 | Stack et al. ..................... | 367/11 |
| 2013/0018881 A1 | * | 1/2013 | Bhatt ............................ | 707/736 |

OTHER PUBLICATIONS

RJ Barton, KB Smith, and HT Vincent; "Characterization of scattered acoustic intensity fields in the resonance region of a motionless rigid sphere". J Acoust Soc Am. Jun. 2010;127(6).*
Robert J. Barton, III, Kevin B. Smith, Harold T. Vincent III, A Characterization of the Scattered Acoustic Intensity Field in the Resonance Region for Simple Spheres, Article, May 2011, pp. 2772-2784, 129(5), Acoustical Society of America, USA.

* cited by examiner

*Primary Examiner* — Isam Alsomiri
*Assistant Examiner* — James Hulka
(74) *Attorney, Agent, or Firm* — James K. Kasischke; Michael P. Stanley

(57) ABSTRACT

A target analysis method that includes the steps of: illuminating a target with acoustic waves; positioning a device at multiple acoustic vector sensing positions about the target in a scattered acoustic field of reflected waves to simultaneously measure acoustic pressure and particle velocity at each vector sensing position; converting using a Hilbert transform the measured acoustic pressures and particle velocities into a complex signal having active real and reactive imaginary vector component; computing respective active and reactive acoustic intensities at each vector components; and mapping field structure nulls being zero crossings of the active and reactive intensities to a bitmap representation of decomposed scattered target acoustic intensities of the target.

12 Claims, 5 Drawing Sheets

US 8,743,657 B1

RESOLUTION ANALYSIS USING VECTOR COMPONENTS OF A SCATTERED ACOUSTIC INTENSITY FIELD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed generally toward a system and method of use for analyzing reflected acoustic fields directed towards a resolution target underwater or in the atmosphere and more specifically toward a system and method of use for fully decomposing a reflected acoustic field into acoustic intensity vector components.

(2) Description of the Prior Art

Sonar systems are well known in the art for tracking and identifying submerged objects or objects in the atmosphere, for mine hunting, for precision underwater mapping and multistatic applications where there is more than one source and/or a receiver.

One sonar system example is a ship that can tow an array of sound-receiving hydrophones arranged in a passive towed array. The passive towed array, in conjunction with sound receiving and signal processing electronics, can detect sound in the water that may indicate the presence of an underwater target. In other arrangements, the ship can tow both the passive towed array and a towed acoustic projector, which together form a bi-static active sonar system. With this arrangement, the towed acoustic projector emits sound pulses.

Each sound pulse travels through the water, striking an object or target in the water, which in turn produces echoes. The echoes are received by the towed array of receiving hydrophones. Therefore, an echo indicates the presence of an underwater object and the direction from which the echo came; subsequently, indicating the direction of the underwater object.

In conventional bi-static active sonar systems, the towed acoustic projector is often deployed and towed separately from the towed array sound receiving hydrophones. A conventional towed acoustic projector typically includes a sound source mounted within a large rigid tow body. The conventional towed acoustic projector is large and heavy.

The towed acoustic projector is typically used to detect objects in deep water and at long ranges. Therefore, the acoustic projector is capable of generating sound having a high pressure level in order to enable the system to receive echoes from and to detect objects in the deep water at long ranges.

The towed array of receiving hydrophones are often deployed and recovered through a hull penetrator below the ship water line. In contrast, in part due to size and weight, the towed acoustic projector is deployed and recovered over the gunwale of the ship with winch and boom equipment.

U.S. Pat. No. 5,438,552 discloses a sonar system for identifying objects including a technique for providing a two-dimensional array of pixels, each one of the pixels representing the intensity of a signal at a predetermined range position and a predetermined cross-range position from a reference position and quantizing the intensity of each one of the pixels into one of a plurality of levels. The technique further includes comparing a distribution of the levels of pixels over a range scan at a cross-range position with the distribution of levels of pixels over a range scan at a different cross-range position to identify the existence of a foreign object such as a mine.

SUMMARY OF THE INVENTION

Accordingly it is a primary object and general purpose of the present invention to provide a sonar system and method capable of more precise target analysis through the use of vector components of sonar waves.

The target analysis method of the present invention comprises the steps of: illuminating a target with acoustic waves; positioning a device at multiple acoustic vector sensing positions about the target in a scattered acoustic field of reflected waves in order to simultaneously measure acoustic pressure and particle velocity at each vector sensing position; converting by using a Hilbert transform the measured acoustic pressures and particle velocities into a complex signal having active real and active imaginary vector components; computing active and reactive acoustic intensities at each vector component; and mapping field structure nulls being zero crossings of the active and reactive intensities to a bitmap representation of decomposed scattered target acoustic intensities of the target.

BRIEF DESCRIPTION OF THE DRAWINGS

A more complete understanding of the invention and many attendant advantages thereto will be readily appreciated as the same becomes better understood by reference to the following detailed description when considered with the accompanying drawings wherein.

DESCRIPTION OF THE INVENTION

Figure 1:
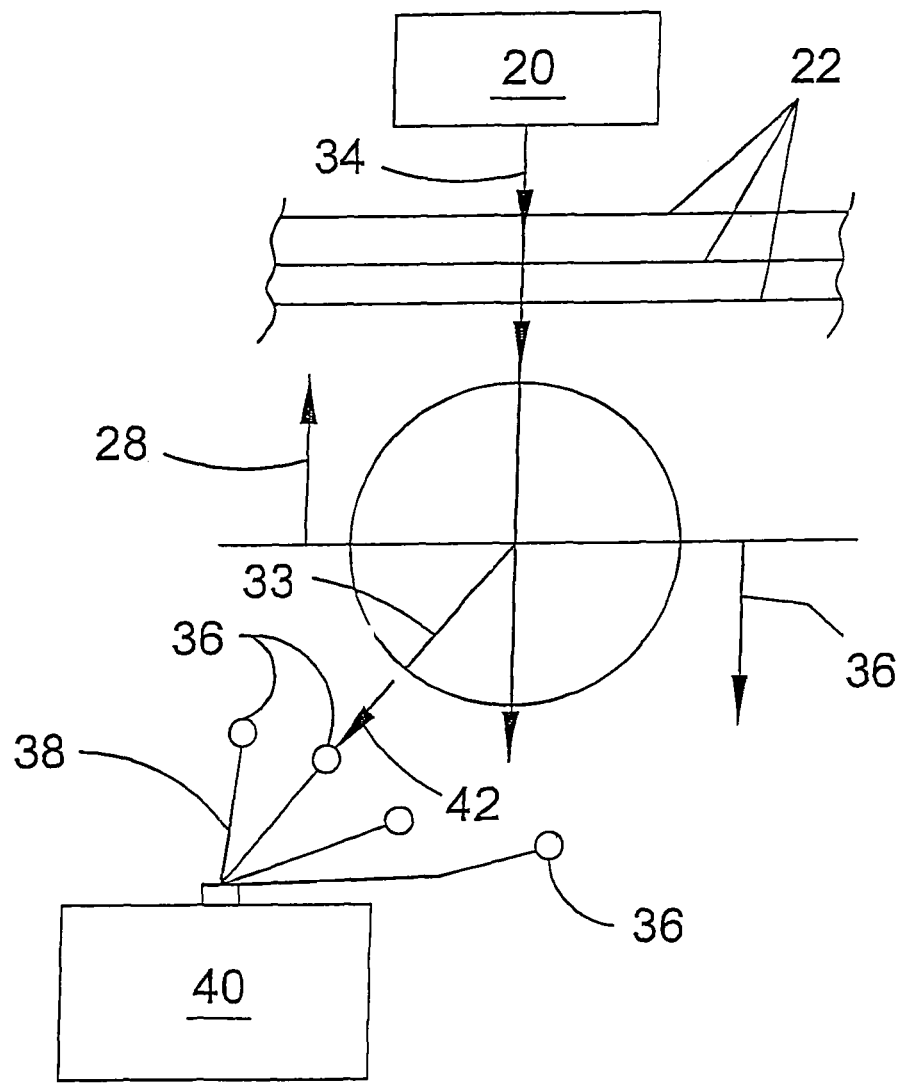
FIG. 1 is a schematic illustrating a sonar target analysis system according to the principles of the present invention.

A sonar tracking system 10 is shown in FIG. 1 to include a sonar transmission or sending system 20 which transmits a signal 34 of infinite-extent sonar waveform planes 22 toward a target 26 (a rigid sphere with a radius 33). From the $\theta=-\tau\gamma$ direction. A radius 32 (in meters) is a distance measured from the center of the target 26 and $\theta$ is the conical angle relative to the normal to the direction of plane wave propagation. The signal 34 illuminates the target sphere 26 and is reflected from the sphere to a back-scattered region 28 and a forward-scattered region 30.

A plurality of acoustic vector sonar sensors or receivers 36 at different vector sensing positions receive a signal 42 from the reflection action. The sensors 36 then simultaneously measure acoustic pressure and particle velocity at each vector sensing position. The measured acoustic pressures and particle velocities are sent via sensing lines 38 to a computer 40 for signal analysis.

Figure 2:
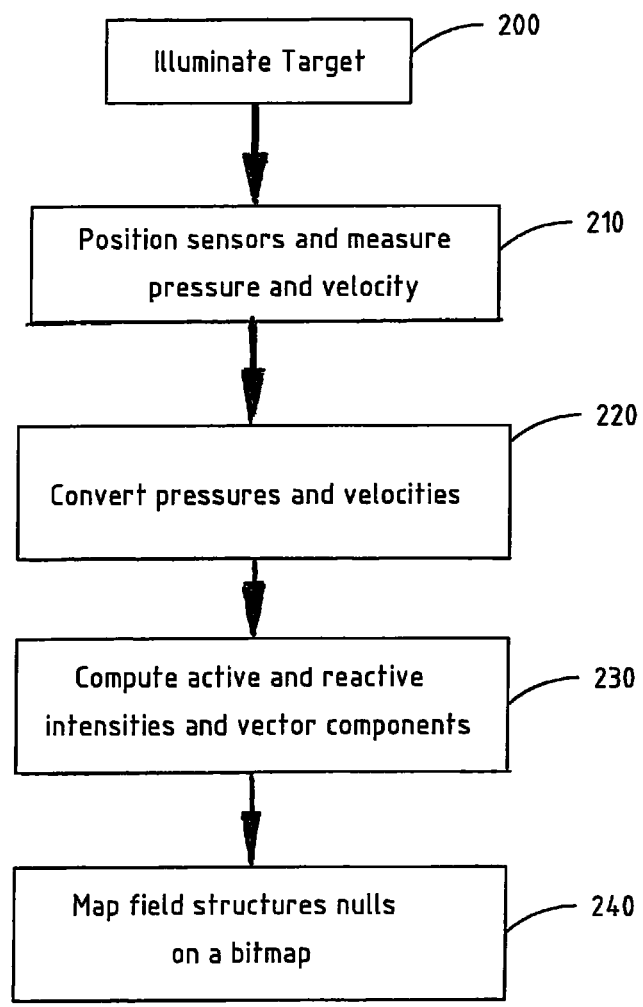
FIG. 2 is a block diagram of steps used in the sonar target analysis according to the principles of the present invention.

The steps of the method are shown in the block diagram of FIG. 2 where the target 26 is illuminated by acoustic wave forms in step 200. The acoustic vector sonar sensors 36 are positioned and measure the acoustic pressures and particle velocities at each vector sensing position in step 210. The measured acoustic pressures and particle velocities are converted into a complex signal in step 220. The active and reactive acoustic intensities are computed at each vector component in step 230. A bitmap representation of decomposed scattered target acoustic intensities is created to include mapping field structure nulls in step 240.

Figure 3:
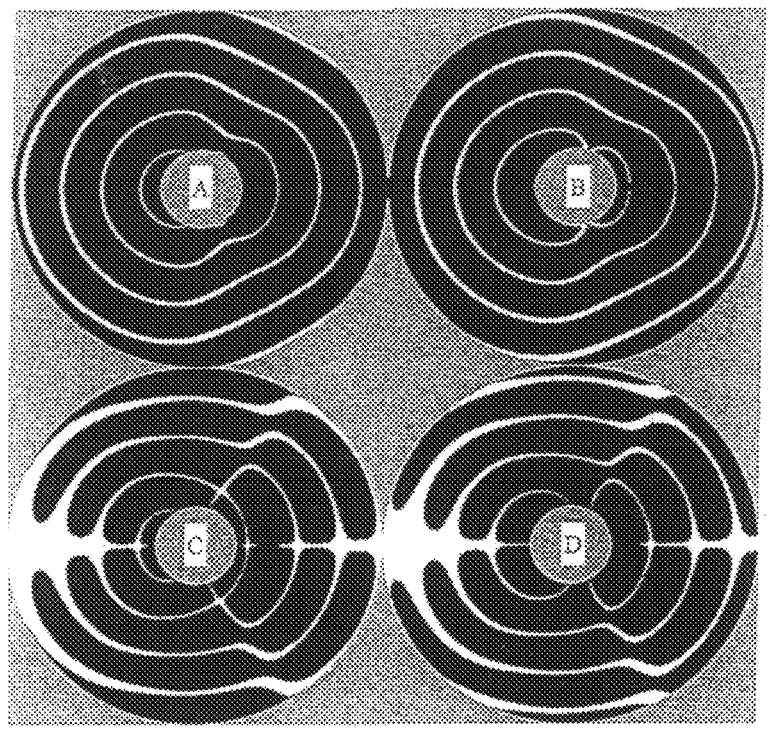
FIG. 3 is a representative bitmap reflection of step 240 of FIG. 2.

A representative bitmap structure of nulls is depicted in FIG. 3. Null mapping is the process of analyzing null structures in a scattered intensity field by a set of logical operations on sparse matrices constructed from separated real and imaginary components of pressure and particle velocity fields.

The details below describe the structure of a scattered acoustic field by using a separation of the complex intensity field into active and reactive components. Utilizing the dimensionless constant relating an incident (or illuminating) wave to a radius of a sphere $2\Pi a/\lambda$ (or ka); a particular scattered region of interest is in the region of interest is in the resonance range (ka~3) where the scattered diameter is approximately equal to 1λ and creeping waves are diffracted around the scatterer and combine with pressure scattered by the illuminated surface.

The phase differences caused by the acoustic path lengths of the diffracted waves cause interference patterns that vary with frequency and scattered characteristics which include geometry and material properties. Through a power mapping of the real (active) and imaginary (reactive) complex acoustic intensity; the effects of the illuminated target characteristics on the total acoustic energy fields are characterized.

Of further interest is the understanding of how the scattered vector field characterization extends and transitions into the far-field. In the preferred embodiment, fully-developed scattered intensity fields from simple rigid spheres are examined. Numerical and measured results have been studied and modeling will extend to elastic and fluid-filled boundary conditions.

The following embodiment is a simple scattering case for the rigid target sphere 26 of a radius 32 as shown in FIG. 1. However, the method is not limited to a rigid spherical shape target. This description includes derivations for fluid-filled thin wall spheres and evacuated spherical shells.

Cylinder mapping is another example. The target only need be on the size order proportional to approximately one wavelength of the illumination frequency such as in the resonance region, where the acoustic wavelength of the illumination field and scatterer size (2*pi/lambda)*(radius of target) is on the order of two or three.

The target sphere 26 illuminated by infinite-extent plan waves 22 from the $-\pi$ direction. Equation (1) represents the incident pressure $$p_i(R, \theta) = P_i e^{ikr\cos\theta}. \qquad (1)$$

Relating the scattering problem to that of a spherical radiator, the Junger reference expressed the incident pressure field of Equation (1) as a series of Legendre functions as Equation (2), $$P_i(R, \theta) = P_i \sum_{n=0} (2n+1) i^n P_n(\cos\theta) j_n(kR) \qquad (2)$$

Where $P_n(\cos\theta)$ and $j_n(kR)$ are respectively the Legendre polynomial and spherical Bessel function of the first kind. F M, Junger, D. Feit, "Sound, Structures and Their Interactions", copyright 1993 by Acoustic Society of America, Chapter 10.

The general form of the scattered pressure field from a rigid sphere (∞ denotes the rigid boundary condition of infinite acoustic impedance) is then Equation (3):

$$p_{s\infty}(R, \theta) = -P_i \sum_n (2n+1) i^n P_n(\cos\theta) b_n h_n(kR), \quad b_n = \frac{j_n'(ka)}{h_n'(ka)} \qquad (3)$$

The symbols $h'_n$ and $j'_n$ are the Hankel and Bessel function of the first kind and their derivatives, respectively.

The vector field describing the complex scattered acoustic intensity is given by Equation (4):

$$J = \frac{1}{2} p u^* = I + iQ_4, \, p = p_i + p_{s\infty}, \qquad (4)$$

The symbols p and u* are respectively the complex acoustic scalar pressure and conjugated particle velocity. I is the scattered active Intensity. Q is the scattered reactive intensity.

The particle velocity field is related to the gradient of the scalar pressure field by the momentum equation, which in axis-symmetric spherical coordinates becomes Equation (5):

$$\nabla p(R, \theta) = i\rho \, ck \, u(R, \theta). \qquad (5)$$

The scattered velocity field u is found in Equation (6) by combining Equations (2), (3), and (5):

$$u(R, \theta) = \frac{P_i}{\rho c} \sum_n (2n+1) i^{n-1} \Big\{ P_n(\cos\theta)[j_n'(kR) - b_n h_n'(kR)]\hat{r} - \\ P_n'(\cos\theta)\frac{\sin\theta}{kR}[j_n(kR) - b_n h_n(kR)]\hat{\theta} \Big\} \qquad (6)$$

For analysis, it is desirable to maintain the separable spatial vector and complex components of the time: averaged scattered acoustic intensity field as shown in Equation (7) where J (R,θ) is the complex scattered acoustic intensity, I (R,θ) is the real part of J, and Q (R,θ) is the imaginary part of J.

$$J(R, \theta) = I(R, \theta) + iQ(R, \theta) \qquad (7)$$

$$I(R, \theta) = \frac{1}{2}\text{Re}\{p\}\text{Re}\{u^*\} - \frac{1}{2}\text{Im}\{p\}\text{Im}\{u^*\}$$

$$Q(R, \theta) = \frac{1}{2}\text{Im}\{p\}\text{Re}\{u^*\} + \frac{1}{2}\text{Re}\{p\}\text{Im}\{u^*\}$$

Empirical data was obtained from Equation (7) with an eighteen inch (0.4572 m) diameter rigid spherical scatterer 200 (radius=0.2294 m), 716.4 Hz incident plane wave 204 from the −π direction, the complex acoustic scalar pressure ρ=1.21 kg/m³, c=343 m/s in air, which represents ka=3.0, where c is the sound speed of acoustic propagation in air. The total power in the scattered instantaneous acoustic intensity field (normalized by ρc) can be obtained as well as the spatial and complex decomposition of the scattered intensity field components.

An experiment exemplifies the viability of extracting field structures that can be seen in the spatial and complex separated components of the scattered acoustic intensity field from direct measurements.

In order to create a scattered field where ka=3, spheres milled from oak with diameters of twelve inches (30.48 cm) and eighteen inches (45.72 cm) were illuminated by a source at 3.6 m of 1000 Hz and 716.4 Hz, respectively. Measurements were collected using an acoustic vector sensor probe with radial velocity recorded on the axial velocity sensor, angular velocity component on the "y" velocity sensor, and scalar pressure on the microphone (See FIG. 4).

In order to ensure that the spherical coordinate velocity components could be measured using orthogonal sensors, the probes were aligned to the equator of the spheres while maintaining the probe axis normal to the surface of the scatterer. A self-leveling laser guide was used to align the geometry. Angles referenced to the maximum response angle (MRA) were hand-measured using distances to a stationary target offset in the test cell.

The raw sensor data was collected through a signal conditioner with gain set to "high" and corrections turned "off". At each position, 20,000 samples at a rate of 5120 Hz (approximately four seconds) were acquired (known herein as a data record). Samples were taken primarily along an arc in the forward scattered region. Data was also collected in the forward scattered region for both spheres.

The data samples (time series) from the sensors were processed by first applying phase and sensitivity calibrations, and then filtered to remove 60 Hz noise components. The real signals x(t) were then combined with the Hilbert transform to create the analytic signal $$\tilde{x}(t) = x(t) + i\hat{h}(x(t)) = \text{Re}\{x(t)\} + i\text{Im}\{\tilde{x}(t)\} \quad (8)$$

where h(x(t)) is the Hilbert transform of x(t). The analytic signals of pressure and velocity were then used to compute the four components of the scattered intensity field in spherical coordinates. For each acquired data record (n) of 20,000 samples, at a position $R_n, \theta_n$ the spatial and complex separated components of the time-averaged scattered acoustic intensity field are computed in Equation (9).

$$I\hat{r}(R_n, \theta_n) = \text{mean}\left|\text{Re}\left\{\frac{1}{2}pu^*_{green}(R_n, \theta_n)\right\}\right| \quad (9)$$

$$I\hat{\theta}(R_n, \theta_n) = \text{mean}\left|\text{Re}\left\{\frac{1}{2}pu^*_{red}(R_n, \theta_n)\right\}\right|$$

$$Q\hat{r}(R_n, \theta_n) = \text{mean}\left|\text{Im}\left\{\frac{1}{2}pu^*_{green}(R_n, \theta_n)\right\}\right|$$

$$Q\hat{\theta}(R_n, \theta_n) = \text{mean}\left|\text{Im}\left\{\frac{1}{2}pu^*_{red}(R_n, \theta_n)\right\}\right|$$

Figure 4:
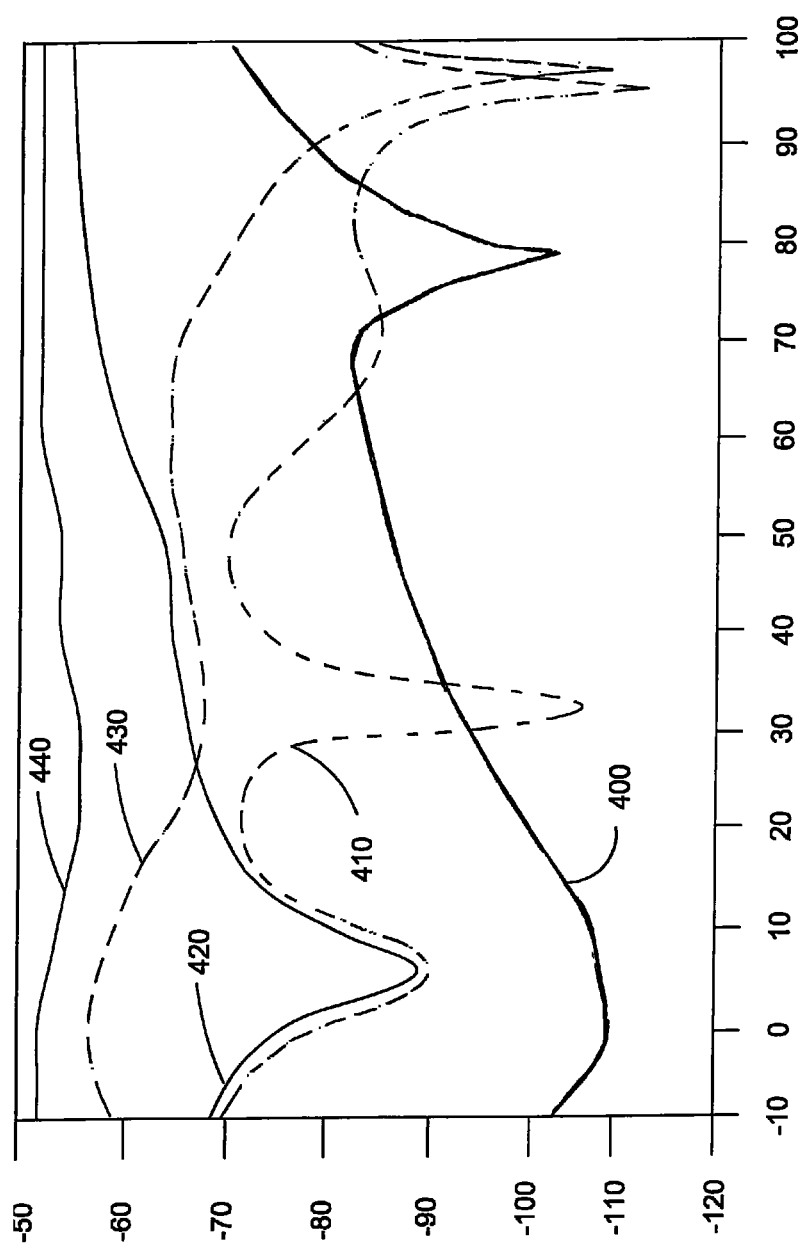
FIG. 4 is a results chart using a spherical target with an eighteen inch radius.

FIG. 4 illustrates the agreement of the structure in the forward-scattered region between the model and field measurements for time-average steady-state acoustic intensity for the eighteen inch sphere illuminated by 716 Hz plane waves (ka=3). The structure of most components was observed to agree with the exception of the reactive radial intensity.

Figure 5:
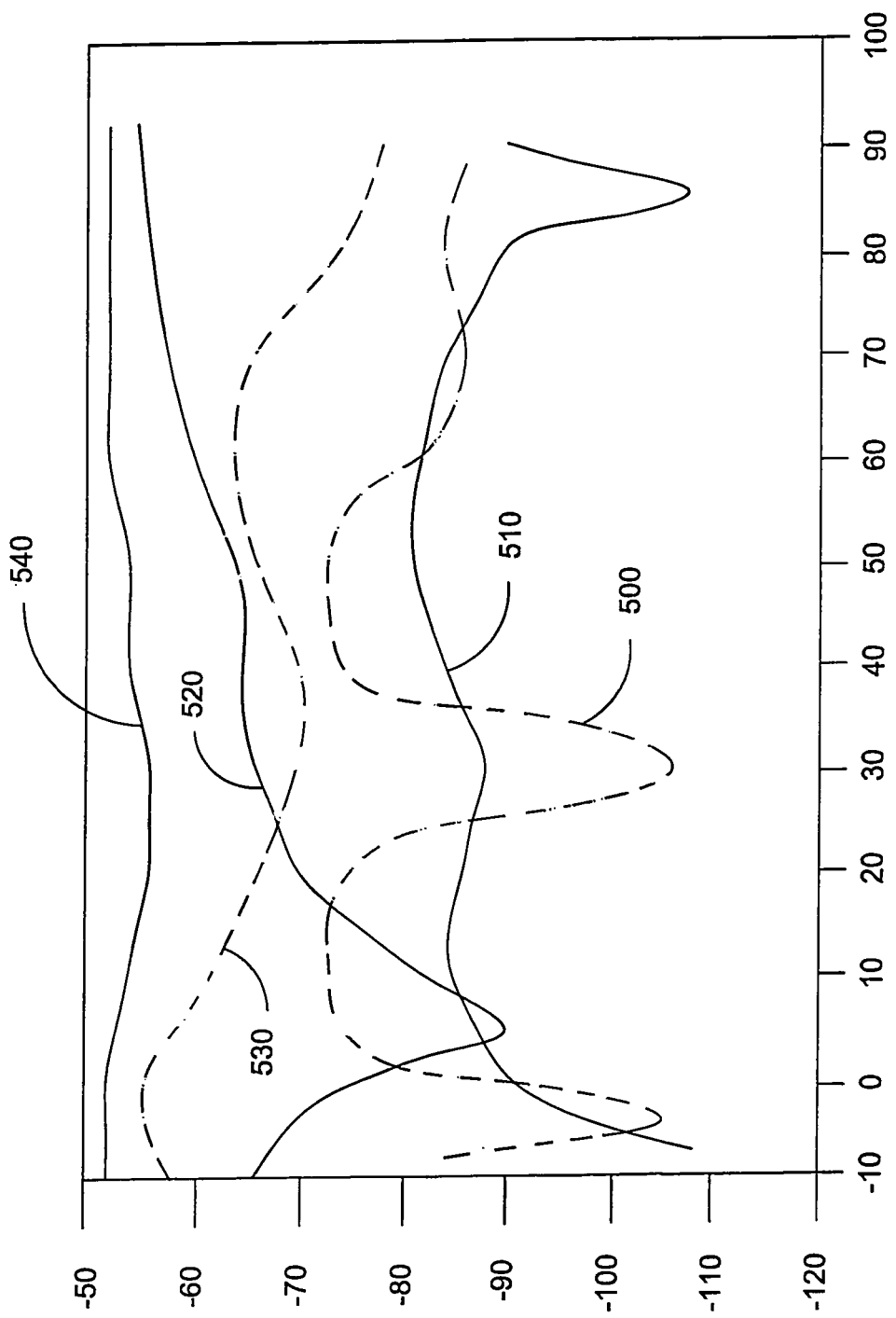
FIG. 5 is a results chart using a spherical target with a twelve inch radius.

FIG. 5 illustrates from testing of the twelve inch sphere. In both FIGS. 4 and 5, the horizontal axis represents the angle in degrees relative to zero which is the direction of the illumination wave in the forward region. The vertical axis represents pressure and intensity measured in decibels.

In both the twelve inch and eighteen inch sphere analysis, an inspection of the measured reactive radial intensity component indicates that the data matches the model more precisely at a slightly closer range than measured. Given the sensitivity to range for these particular features in the forward scattered region, the range differences noted can be accounted for by small misalignment in both altitude and attitude of the sensor.

The results for testing of the eighteen inch sphere in FIG. 4 include the active radial intensity 430, the active angular intensity 420, the reactive radial intensity 400, the reactive angular intensity 410, and the pressure 440.

The results for testing of the twelve inch sphere in FIG. 5 include the active radial intensity 530, the active angular intensity 520, the reactive radial intensity 510, the reactive angular intensity 500, and the pressure 540.

The analytical model and experimental data illustrates the ability to extract scattered field features from direct measurement of the time-averaged acoustic intensity field for simple rigid objects.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A target resolution analysis method comprising the steps of:
    illuminating a target with acoustic waves;
        positioning a device at multiple acoustic vector sensing positions approximate to the target in a scattered acoustic field of reflected waves;
    simultaneously measuring acoustic pressure and particle velocity at each of the vector sensing positions;
        converting with a Hilbert transform the measured acoustic pressures and particle velocities into a complex signal having active (real) and reactive (imaginary) vector components;
    computing active and reactive acoustic intensities at each of the vector components; and
    mapping decomposed scattered active and reactive acoustic intensity minimum field structures (nulls) to a bitmap representation of the target.

2. The resolution analysis method of claim 1 wherein the step of computing active intensities $I_x$ is accomplished by $$I_x = \frac{\text{Re}\{pu_x^*\}}{2}$$

and computing reactive intensities $Q_x$ is accomplished by $$Q_x = \frac{\text{Im}\{pu_x^*\}}{2}$$

wherein x=I, j, or k represents a three-dimensional coordinate system and u* is a complex conjugate of a complex particle velocity u.

3. The resolution analysis method of claim 2 further comprising the step of computing an active time average and a reactive time average at each field coordinate subsequent to computing respective active and reactive acoustic intensities at each vector component.

4. The resolution analysis method of claim 2 wherein said step of mapping field structure nulls is provided at regions of minimal active intensity power and minimum reactive intensity power.

5. The resolution analysis method of claim 1 wherein the measured acoustic pressures and particle velocities are three dimensional.

6. The resolution analysis method of claim 1 wherein the measured acoustic pressures and particle velocities are filtered, calibrated and normalized prior to said conversion step using the Hilbert transform.

7. The resolution analysis method of claim 1 further comprising the step of determining target composition from the bitmap representation of decomposed scattered target acoustic intensities of the target.

8. A target analysis system comprising:
an acoustic transmission system for propagating acoustic waves to a target;
a receiving system for receiving the acoustic waves after being reflected from the target with said receiving system including multiple acoustic vector sensors at different positions to enable simultaneous measurement of acoustic pressures and particle velocities at a vector sensing position; and
a computing system specifically configured for analyzing the measured acoustic pressures and particle velocities, wherein said computing system is capable of converting the measured acoustic pressures and particle velocities into a complex signal having active (real) and reactive (imaginary) vector components using Hilbert transform and wherein said computing system is capable of computing respective active and reactive acoustic intensities at each vector and mapping the decomposed scattered active and reactive acoustic intensity minimum field structures to a bitmap representation of the target.

9. The resolution analysis system of claim 8 wherein said computing system further comprises computing the active intensities $I_x$ is accomplished by $$I_x = \frac{\text{Re}\{pu_x^*\}}{2}$$

and computing reactive intensities $Q_x$ is accomplished by $$Q_x = \frac{\text{Im}\{pu_x^*\}}{2}$$

where x=I, j, or k represents a three-dimensional coordinate system and u* is a complex conjugate of a complex particle velocity u.

10. The resolution analysis system of claim 9 wherein said computing system further comprises computing an active time average and a reactive time average at each field coordinate after computing respective active and reactive acoustic intensities at each said vector component.

11. The resolution analysis system of claim 9 wherein said computing system further comprises mapping field structure nulls at regions of minimal active intensity power and minimum reactive intensity power.

12. The resolution analysis system of claim 8 wherein the measured acoustic pressure and particle velocities are three-dimensional.

* * * * *